United States Patent

[11] 3,593,612

| [72] | Inventor | Karl Peter Schulze |
| | | Carrum, Victoria, Australia |
| [21] | Appl. No | 847,002 |
| [22] | Filed | July 29, 1969 |
| [45] | Patented | July 20, 1971 |
| [73] | Assignee | Illinois Tool Works, Inc. |
| | | Chicago, Ill. |
| [32] | Priority | July 31, 1968 |
| [33] | | Australia |
| [31] | | 41481/68 |

[54] SEALING AND ANCHORING DEVICE
1 Claim, 7 Drawing Figs.

[52] U.S. Cl. ............................................ 85/80, 85/83
[51] Int. Cl. ........................................ F16b 13/04
[50] Field of Search ............................ 85/80, 82, 83, 84; 24/73 PM, 73 PF, 73 HS

[56] References Cited
UNITED STATES PATENTS

| 2,836,214 | 5/1958 | Rapata | 85/80 |
| 3,105,407 | 10/1963 | Rapata | 85/84 |
| 3,200,694 | 8/1965 | Rapata | 85/82 |
| 3,205,760 | 9/1965 | Seckerson et al. | 85/82 |
| 3,319,918 | 5/1967 | Rapata | 85/82 |
| 3,334,410 | 8/1967 | Forward | 85/80 |
| 3,358,551 | 12/1967 | Seckerson | 85/80 |
| 3,434,521 | 3/1969 | Flora | 85/83 |
| 3,469,493 | 9/1969 | Fisher | 85/80 |

FOREIGN PATENTS

| 996,455 | 6/1965 | Great Britain | 85/80 |

Primary Examiner—Marion Parsons, Jr.
Attorneys—Robert W. Beart, Michael Kovac, Barry L. Clark and Jack R. Halvorsen ABSTRACT: The invention is in an improved device for providing an anchor for a screw or the like and for providing a fluidtight seal to a panel into which it is inserted. The device has a body portion adapted to be engaged in the panel and has means on the outer surfaces thereof to engage the panel and provide a secure anchorage thereto and operable to provide a fluidtight seal with the panel.

PATENTED JUL 20 1971 3,593,612
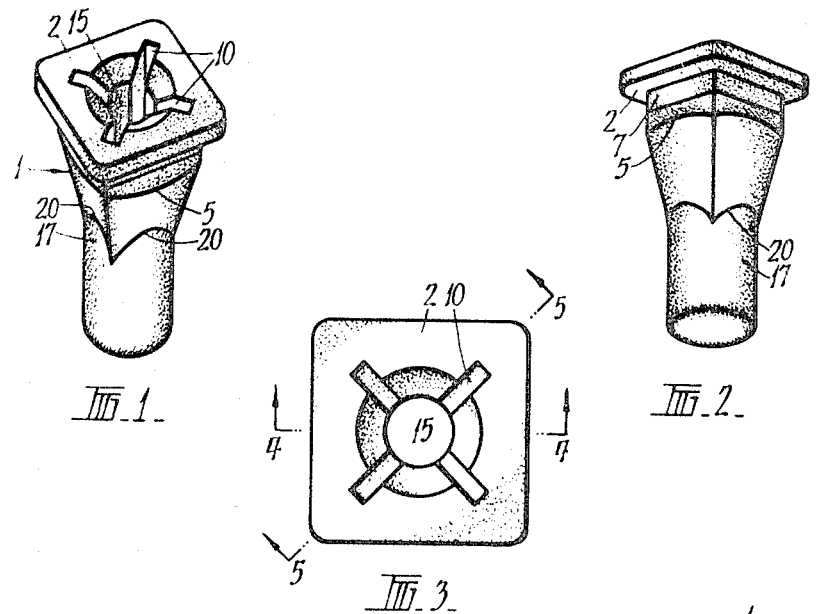
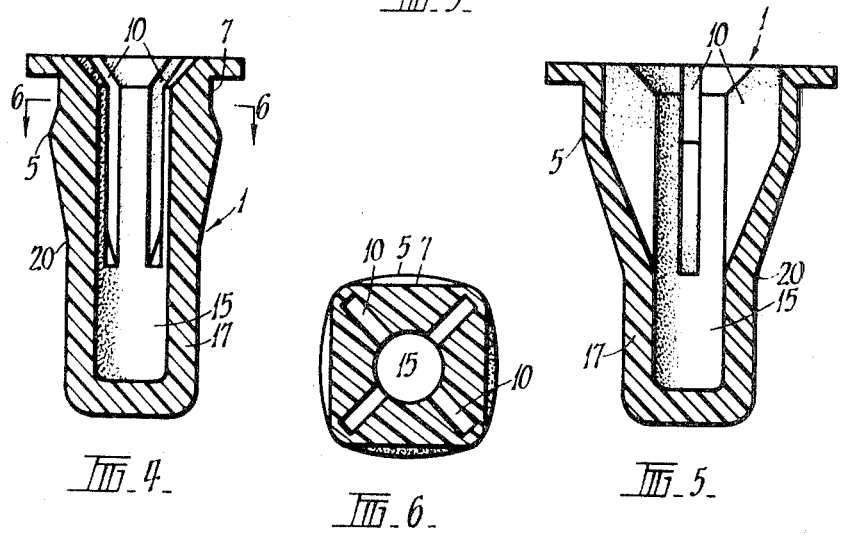
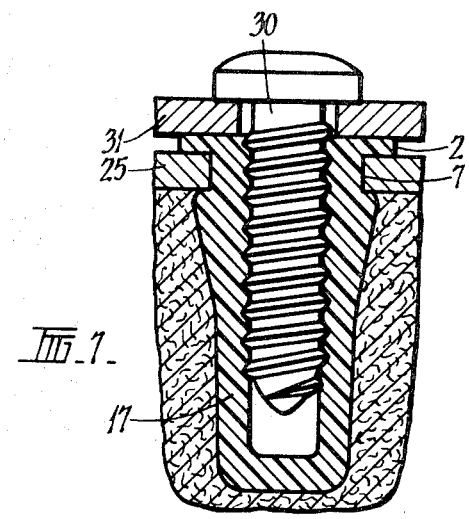
INVENTOR
Karl Peter Schulze
BY
His Att'ys

SEALING AND ANCHORING DEVICE

STATEMENT OF THE INVENTION

The present invention relates to a sealing and anchoring device and relates particularly but not exclusively to a sealing and anchoring device with a blind aperture therein which is adapted for providing an anchor for a rodlike member, such as a screw, to a panel and for providing a fluidtight seal between the panel and the device.

Such devices are particularly suitable for use in the manufacture of refrigerator bodies, cabinets, doors and panels which are double-walled and between which is injected liquid which forms a foam.

The device in use is fastened to one wall of the body in a preformed aperture therein to effect a fluidtight seal of the aperture. Once fitted the liquid can be injected into the bodies without fear of escaping through the aperture.

DESCRIPTION OF PRIOR ART

Hitherto in the manufacture of refrigerator bodies, cabinets, doors and panels preformed apertures have to be taped or blocked to prevent the escape of the liquid resin as it is formed thereinto. Such taping or blocking is laborious and adds to the overall cost of the bodies.

DESCRIPTION OF THE DRAWINGS

FIG. 1 is a top perspective view of the device;

FIG. 2 is an underneath perspective view of the device shown in FIG. 1;

FIG. 3 is a plan view of the device shown in FIGS. 1 and 2;

FIG. 4 is a cross-sectional view along lines 4-4 in FIG. 3;

FIG. 5 is a cross-sectional view along lines 5-5 in FIG. 3;

FIG. 6 is a cross-sectional view along the lines 6-6 in FIG. 4; and

FIG. 7 is a view showing the device in use.

DESCRIPTION OF THE PREFERRED EMBODIMENTS

The preferred device has a substantially square body portion 1 in cross section, and also has a substantially square flat head portion 2. The neck portion 7 of the body portion 1 extends downwardly from the head portion 2, to an intermediate portion 5 thereof which is of curved segmented peripheral shape as shown in FIG. 6.

The flat head 2 of the grommet is larger than the cross section dimension of the main body part in the region of intermediate portion 5.

The head 2 and the neck 7 and the intermediate portion 5 constitute what will be generally referred to as a grommet.

As shown specifically in FIG. 3 there is provided a starlike cross formed by slots 10 molded in the body part 1. The slots 10 communicates with the blind bore 15 of the device and extend radially outwardly towards each corner of the body. The open end of the blind bore 15 is bevelled as shown by 23 to assist in the insertion and location of a screw to be held therein.

The blind bore 15 extends into the circular cross-sectioned entering end 17 of the device and terminates therein. The surface of the entering end 17 intersects with the surfaces of the square body portion along the lines 25. The portion of the device between the intermediate portion 5 and the extreme bottom end of the entering end 17 will be generally referred to as a tubular portion of the device.

In use, the device is pressfittedly inserted in a square aperture in a panel 25 and snap locks therein and, as shown in FIG. 7, a screw 30 can be screwed into the bore 15 to secure an object 31 thereto. The insertion of the screw 30 will tend to spread the grommet, expanding the neck portion 7 and the part of the intermediate portion 5 about the underneath surface of panel 25.

It will be appreciated that the cross formation of the slots 10 assist in enabling the device to be flexed to snap engage with the aperture 25, and that the device seals the aperture 25 before the screw 30 is inserted in the bore 15.

As the engaging parts of the grommet portion and aperture 25 are square and of substantially identical size, rotation of the device is resisted when the screw 30 is inserted in the bore. Further the physical shape of the grommet portion, in the region of the neck 7, assists in providing a rigid connection of the device to the panel 25 and provides a fluidtight seal of the grommet with the panel 25.

I claim:

1. A one piece plastic screw grommet adapted to be used with a screw-threaded member having a predetermined diameter, said grommet including a head portion, and a substantially square body portion extending from said head portion, said body portion including a square neck portion extending downwardly from the head portion, an intermediate portion having a curved segmented pyramidal-shaped periphery blending outwardly from said neck portion to a maximum dimension to form a shoulder facing said head portion the sides thereof formed as conical segments adapted to provide a tapering surface leading to said shoulder means whereby said shoulder means are at their greatest diametral point intermediate the corners of the body portion of the grommet and said intermediate portion further blending radially inwardly from said maximum dimension at a reduced taper to a cylindrical closed end tubular portion forming the free end of said grommet, a bore traversing said head and extending through said body portion to a point adjacent said closed end, closed slot means communicating with said bore and extending radially outwardly toward each corner of said body, said slot means defining a substantial volume and extending axially through said head to a point adjacent the juncture of said intermediate portion with said tubular portion, said bore having a predetermined diameter less than the major diameter of the screw-threaded member with which it is adapted to be associated whereby upon the insertion of the grommet in a complementary-shaped aperture of a mounting panel results in a radial and circumferential collapsing of the intermediate portion during insertion until the shoulder means passes through the panel and temporarily mounts the grommet in the panel and insertion of said screw results in a radial expansion of said intermediate and tubular portions to more aggressively urge said shoulders into underlying relationship to said panel.